United States Patent [19]
Gardner

[11] Patent Number: 5,685,571
[45] Date of Patent: Nov. 11, 1997

[54] PIPE SOCKET

[75] Inventor: Ray Gardner, Broken Arrow, Okla.

[73] Assignee: Badjer Meter, Inc., Milwaukee, Wis.

[21] Appl. No.: 534,439

[22] Filed: Sep. 27, 1995

[51] Int. Cl.$^6$ ............................... F16L 55/00; F16L 35/00
[52] U.S. Cl. .................... 285/12; 285/93; 285/176; 285/286; 228/56.5
[58] Field of Search ..................... 285/12, 93, 176, 285/286; 228/56.5, 103

[56] References Cited

U.S. PATENT DOCUMENTS

| | | | |
|---|---|---|---|
| 1,040,039 | 10/1912 | Shapro | 285/177 X |
| 1,294,255 | 2/1919 | Garretson | 285/177 |
| 2,867,036 | 1/1959 | Hovelmann . | |
| 3,078,551 | 2/1963 | Patriarca et al. . | |
| 3,311,392 | 3/1967 | Buschow | 285/286 X |
| 3,473,215 | 10/1969 | Stevens | 29/483 |
| 3,514,130 | 5/1970 | Milleville | 285/286 X |
| 3,823,464 | 7/1974 | Chartet | 29/470.5 |
| 3,894,757 | 7/1975 | Best | 285/286 X |
| 4,130,931 | 12/1978 | Norcross | 29/527.5 |
| 4,179,141 | 12/1979 | Newman | 285/286 X |
| 4,722,556 | 2/1988 | Todd | 285/12 |

*Primary Examiner*—Terry Lee Melius
*Assistant Examiner*—Heather Shackelford
*Attorney, Agent, or Firm*—Quarles & Brady

[57] ABSTRACT

A socket accommodates pipes of different wall thicknesses that are to be joined by a fillet weld. The socket has a body with a central opening in one face. The face includes a series of physical indicators each of which are spaced from the opening a distance corresponding to the proper fillet height for one of the pipe wall thicknesses. The indicators may be a series of steps, protrusions, or grooves. The socket may be formed in an adapter to join pipes to another member, or the socket may be formed integral with a member such as a valve body, a flange, or a pipe connector.

8 Claims, 3 Drawing Sheets

PIPE SOCKET

BACKGROUND OF THE INVENTION

This invention relates to the attachment of pipes of different wall thicknesses to a socket by means of a fillet weld or the like, and particularly to a socket for the pipe which indicates the proper height of the fillet for each size of pipe thickness.

Standard size valves and similar equipment must often accommodate connection to pipes of a variety of wall thicknesses. When a pipe is connected to an opening in such a valve by welding, the size of the weld that is required depends on the wall thickness of the pipe—the thicker the wall the larger the weld. The present invention provides a visual indication of the height of the fillet weld that is required for each pipe thickness according to nationally recognized standards. The visual indications permit the person making the connection to form a weld having the proper fillet height with certainty and also provides for easy postweld inspection by others to determine that a proper weld has been made.

The present invention can be incorporated into a combined fitting and adapter which acts as a connection between the pipe and an opening in the valve or other equipment. The invention can also be incorporated into a socket that is integral with a part to be joined to a pipe, such as a flange, or it can be incorporated into a connection for joining pipes.

Although the invention is of particular use in making arc welded connections of pipes to sockets, it is also useful when other fillet connections are made such as by braising or with epoxy.

It is a principle object of the invention to take the uncertainty out of forming a proper fillet when connecting pipes of different wall thicknesses to a socket opening.

It is also an object of this invention to provide a simple socket for connecting pipes of different thicknesses to an opening with an absolute visual indication of the proper fillet height for each size of pipe.

SUMMARY OF THE INVENTION

In accordance with the invention, a socket is provided for pipes of different wall thicknesses which has a body with an opening through one face of the body and a series of indicators on the face of the body about the opening. Each indicator is spaced from the opening a distance corresponding to the proper fillet height for one of the pipe wall thicknesses.

The socket may be formed in an adapter having a second face on the body with a protrusion or boss which is connected to the opening of another member, such as a valve, by a second fillet.

The pipes may be of any size wall thickness, including thin wall tubing.

Preferably, the indicators are visible steps or ledges which are formed into the face of the body. The indicators may also be a series of concentric grooves or ridges formed into the face of the body.

The invention also resides in a method of connecting pipes of different sizes of wall thickness into a body having an opening in a face of the body. The method comprises forming a series of physical indicators on the face of the body, each indicator being at a distance from the opening corresponding to the height of a proper fillet for attaching one of the sizes of pipes to the body, inserting a pipe of one size into the opening, selecting the indicator corresponding to the one size of pipe, and forming a fillet joint between the body and the pipe having a height equal to the distance from the opening to the selected indicator.

The foregoing objects and advantages of the invention will appear in the detailed description that follows. In the description, reference is made to the accompanying drawings which illustrate preferred embodiments.

DETAILED DESCRIPTION OF THE PREFERRED EMBODIMENTS

Figure 1:
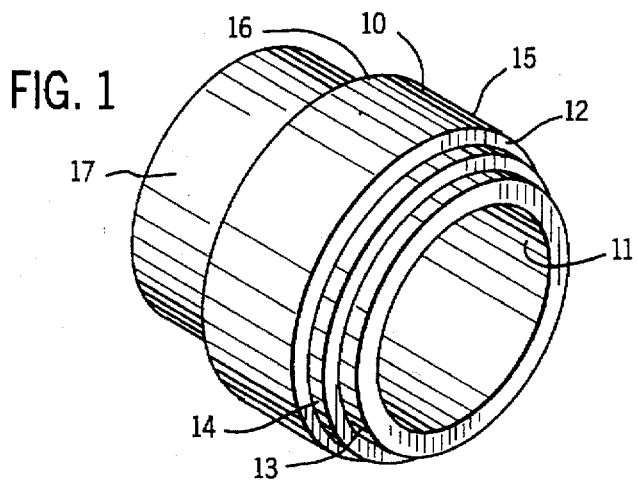
FIG. 1 is a view in perspective of an adapter using a socket in accordance with the invention.
Figure 2:
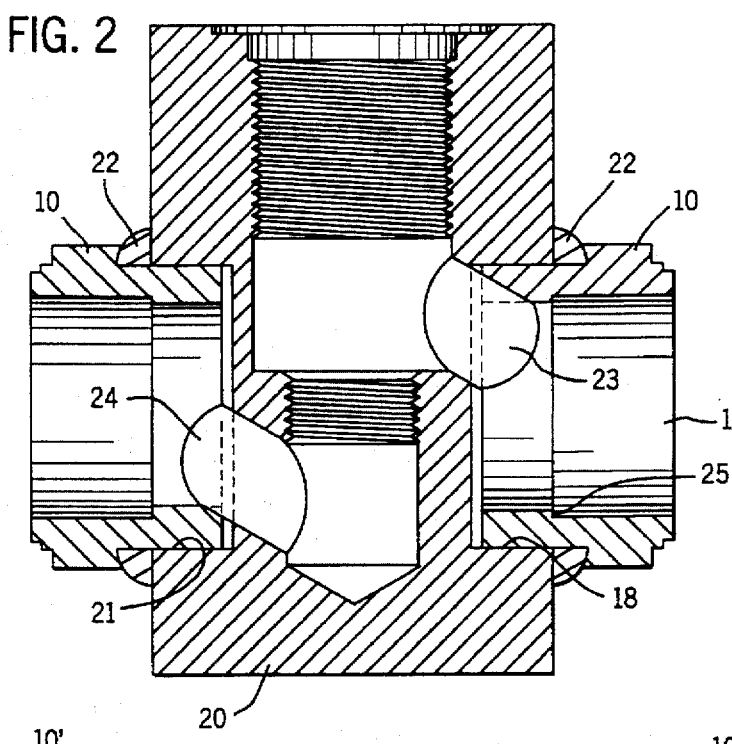
FIG. 2 is a view in cross-section showing two of the adapters connected to a valve.
Figure 4:
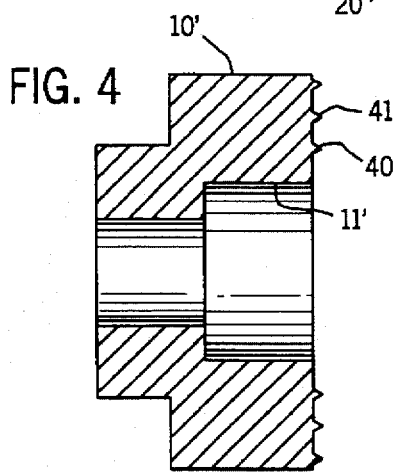
FIGS. 4 and 5 are views in cross-section of two additional embodiments of the adapter.

Referring to FIGS. 1–3, the socket is shown formed in an adapter with a body 10 having a central opening 11. One face 12 of the body is provided with a series of steps 13 and 14 which are concentric with the opening 11. The outer perimeter 15 of the body defines a further step. The opposite face 16 of the body 10 has a boss 17 adapted to be received into an opening 18 in a valve body 20. The valve body 20 has a second opening 21 which receives a second adapter.

As shown in FIG. 2, the two adapters are welded to the valve body 20 by fillet welds 22 so that the adapters become extensions of the valve body 20. In the particular use shown in FIG. 2, valve passages 23 and 24 are formed after the adapters have been welded in place.

The central opening 11 in the adapter includes a counterbore that defines a ledge 25 that is the bottom point of insertion of a pipe into the adapter.

Figure 3A:
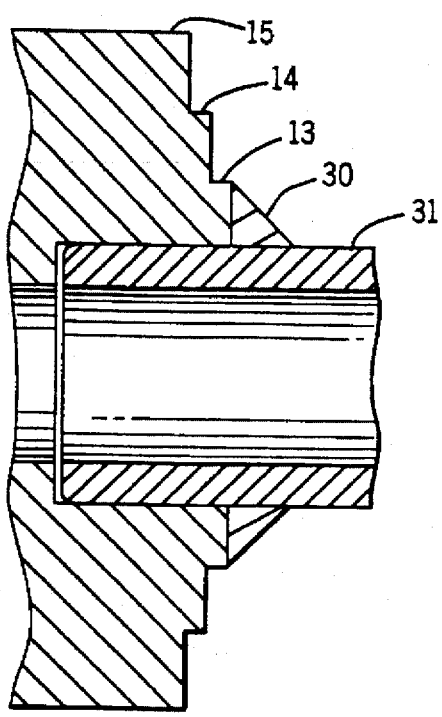
FIGS. 3a, b, and c are views in cross-section showing the connection of pipes of three different wall thicknesses to the adapter of FIGS. 1 and 2.
Figure 3B:
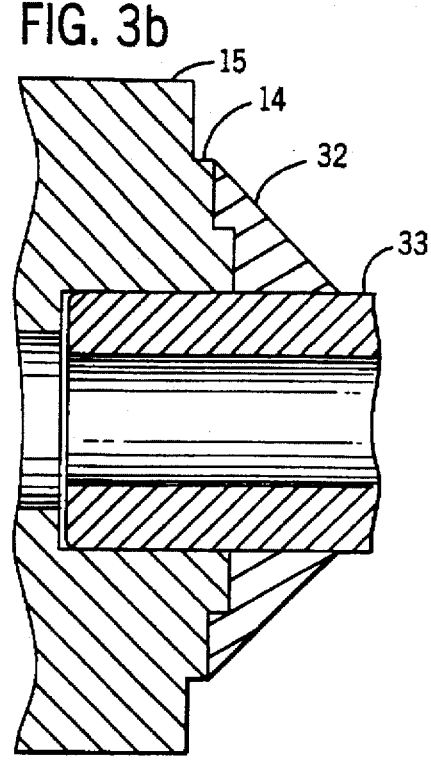
Figure 3C:
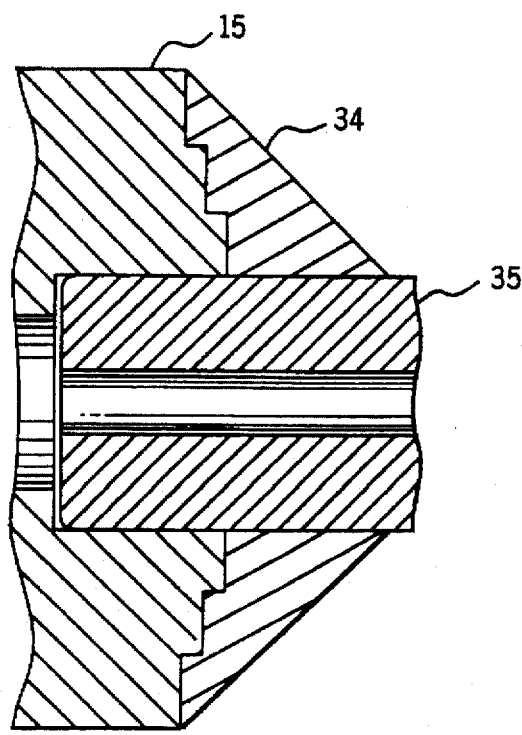

Standard ANSI B31.3-1984 states that the minimum height for a fillet weld for socket weld fittings should be 1.25 times the wall thickness of the pipe. If the minimum height is exceeded, overheating of the body can result during the welding process. Each of the steps 13 and 14 and the outer perimeter 15 of the body 10 are formed at a distance from the central opening 11 that corresponds to the proper height for a pipe of a particular wall thickness. For example, the adapter of FIGS. 1 through 3 is designed to accommodate a series of pipe wall thicknesses such as Schedule 40, 80, and 160 pipes. The first step 13 is at a distance from the central opening corresponding to the proper height of a fillet weld 30 for a Schedule 40 pipe 31, as shown in FIG. 3a. As shown in FIG. 3b, the second step 14 is at a distance from the central opening 11 corresponding to the proper height for a fillet weld 32 for a Schedule 80 pipe 33. Finally, as shown in FIG. 3c, the outer perimeter 15 of the body 10 is spaced from the central opening 11 a distance which will result in a proper height for a fillet 34 for a Schedule 160 pipe 35.

In connecting a pipe to the adapter, the welder selects the step 13, 14, or 15 corresponding to the wall thickness of the pipe and forms a fillet weld up to that step. Whether a proper sized weld has been made is readily ascertainable by determining which steps are exposed and which are not exposed.

The socket with indicators could be formed integral with the valve body instead of being incorporated into an adapter as in the first embodiment.

Figure 5:
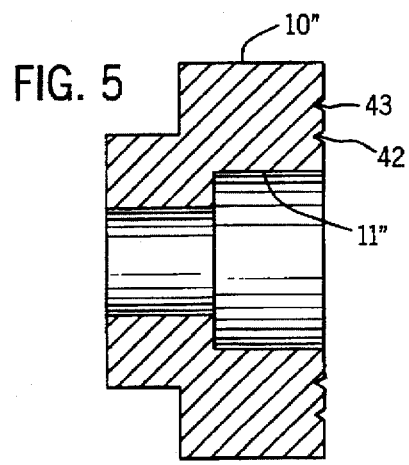

Any number of steps can be provided corresponding to the number of sizes of pipes that the socket is adapted to handle. Also, physical indicators other than steps may be used. For example, circular protrusions 40 and 41 may be used that are formed concentric with the central opening 11' of a body 10' with the protrusions 40 and 41 being spaced concentrically from the center of the opening 11' a distance corresponding to the proper fillet heights. Similarly, as shown in FIG. 5, concentric grooves 42 and 43 may be formed in the face of the body 10" and about the central opening 11". The steps remain the preferred indicators, however, because for inspection purposes, it is easier to determine whether a particular step is exposed than it is for either a protrusion or a groove.

Figure 6:
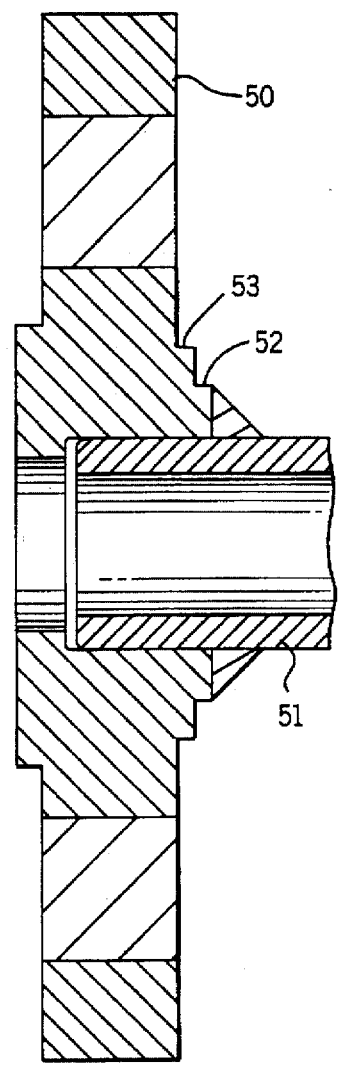
FIG. 6 is a view in cross-section of the socket with indicators incorporated into a flange.

In FIG. 6, the socket with indicators is shown incorporated into a flange 50 to be joined to a pipe 51. Standard ANSI 31.3-1984 states that the minimum height for a fillet weld for a socket weld in such a flange should be 1.40 times the wall thickness of the pipe. The flange 50 is provided with steps 52 and 53 to provide the desired visual indication of the height of the fillet welds according to such standard.

Figure 7:
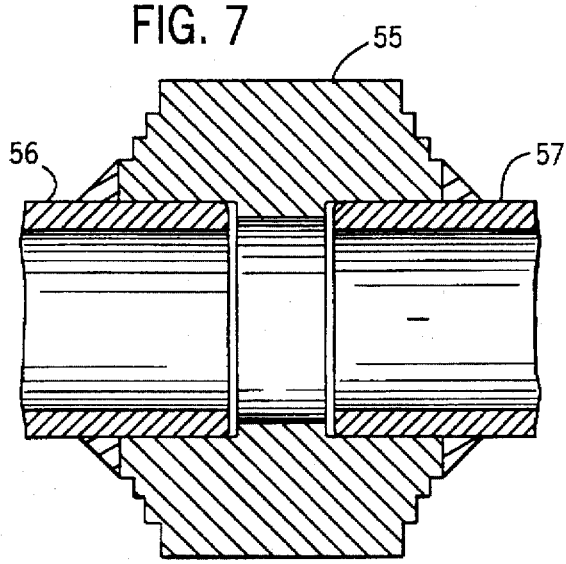
FIGS. 7 and 8 are views in cross-section of sockets with indicators formed into both ends of a pipe connector.
Figure 8:
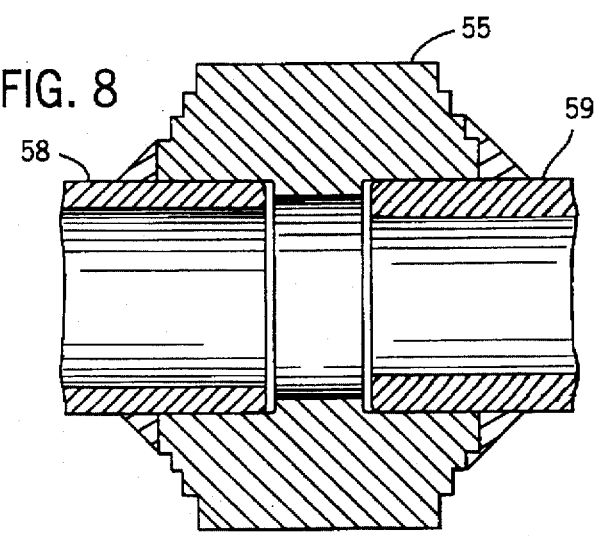

In FIGS. 7 and 8, the sockets with indicators are shown incorporated into both ends of a connector 55 for joining the ends of pipes. In FIG. 7, the pipes 56 and 57 are of equal wall thickness, and fillets of the same height are used at both ends. In FIG. 8, pipes 58 and 59 of different wall thicknesses are joined by the same connector 55 using a different one of the steps to form a fillet weld of a height appropriate to the wall thickness of the respective pipe.

Although the invention has been described in terms of its use with fillet arc welds, it is equally usable for sockets that give visual indications of the proper heights of fillets formed by other methods of joining pipes or tubes to sockets. For example, it could be used with braising or with a fillet of epoxy. The pipes can be of various wall thicknesses, including thin wall tubing.

I claim:

1. A socket for mounting pipes of different wall thicknesses, comprising:

a body having a circular pipe opening through one face of the body, the opening being adapted to receive therethrough any one of the pipes of different wall thicknesses; and a series of fillet indicators on the face of the body about the opening, the indicators lying wholly in a single plane that is transverse to the axis of the opening, each indicator being spaced from the perimeter of the opening a distance that corresponds to the proper height of a fillet that connects the face of the body to a pipe having one of the pipe wall thicknesses.

2. A socket in accordance with claim 1 wherein the indicators are a series of concentric grooves formed into the face of the body.

3. A socket in accordance with claim 1 wherein the indicators are a series of concentric ridges formed in the face of the body.

4. A socket in accordance with claim 1 wherein the body has a protuberance extending in the direction opposite from the face and adapted for connection to a member.

5. A connector for joining the ends of pipes of different wall thicknesses comprised of a socket in accordance with claim 1 at both ends of a common body.

6. A socket for mounting pipes of different wall thicknesses, comprising:

a body having a circular pipe opening through one face of the body, the opening being adapted to receive therethrough any one of the pipes of different wall thicknesses; and fillet indicators on the face of the body about the opening, the indicators comprising a series of steps formed into the face concentric with the opening, the steps having radially outer edges each of which lies wholly in a respective plane that is transverse to the axis of the opening, each edge being spaced from the perimeter of the opening a distance that corresponds to the proper height of a fillet that connects the face of the body to a pipe having one of the pipe wall thicknesses.

7. A socket in accordance with claim 6 wherein the body has a protuberance extending in the direction opposite from the face and adapted for connection to a member.

8. A connector for joining the ends of pipes of different wall thicknesses comprised of a socket in accordance with claim 6 at both ends of a common body.

* * * * *

UNITED STATES PATENT AND TRADEMARK OFFICE
CERTIFICATE OF CORRECTION

PATENT NO.  : 5,685,571
DATED       : November 11, 1997
INVENTOR(S) : Ray Gardner It is certified that error appears in the above-identified patent and that said Letters Patent is hereby corrected as shown below:

Title Page, Item [73] Assignee: change "Badjer" to --Badger--.

Signed and Sealed this

Fifteenth Day of September, 1998

Attest:

BRUCE LEHMAN

Attesting Officer

Commissioner of Patents and Trademarks